Sept. 17, 1968     P. U. PUTSCH     3,401,979
ARTICULATED MOUNT FOR SEATS, PARTICULARLY MOTOR VEHICLE SEATS
Filed Aug. 1, 1966     6 Sheets-Sheet 1
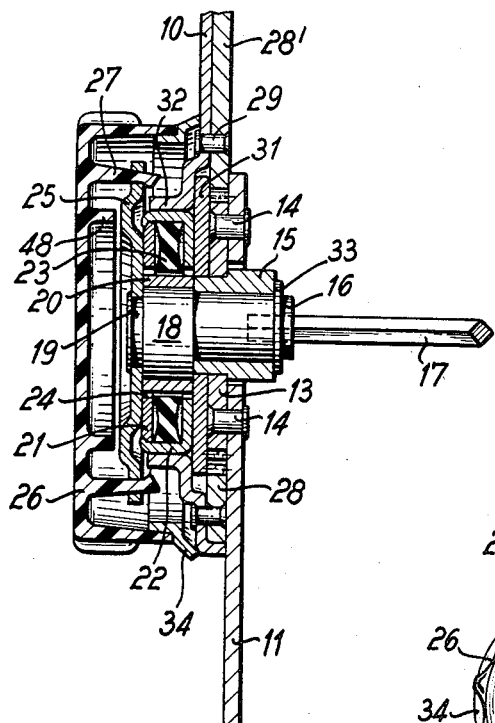
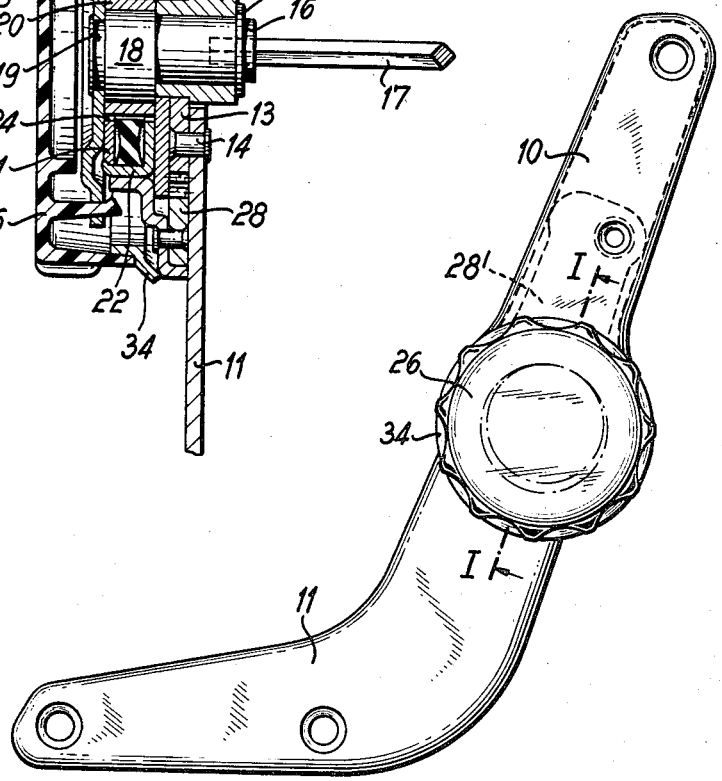
INVENTOR
Peter Ulrich PUTSCH INVENTOR
Peter Ulrich PUTSCH Sept. 17, 1968 P. U. PUTSCH 3,401,979
ARTICULATED MOUNT FOR SEATS, PARTICULARLY MOTOR VEHICLE SEATS
Filed Aug. 1, 1966 6 Sheets-Sheet 3

INVENTOR
Peter Ulrich PUTSCH

Sept. 17, 1968  P. U. PUTSCH  3,401,979
ARTICULATED MOUNT FOR SEATS, PARTICULARLY MOTOR VEHICLE SEATS
Filed Aug. 1, 1966  6 Sheets-Sheet 4

INVENTOR

Peter Ulrich PUTSCH

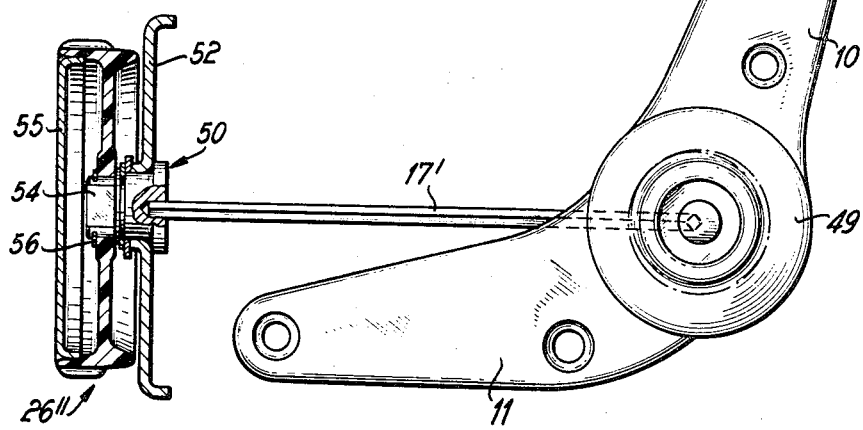
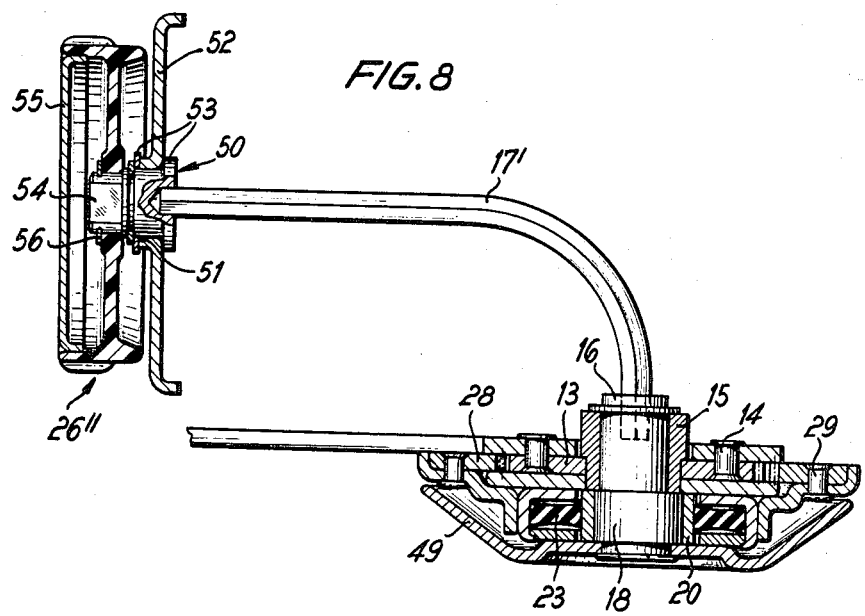

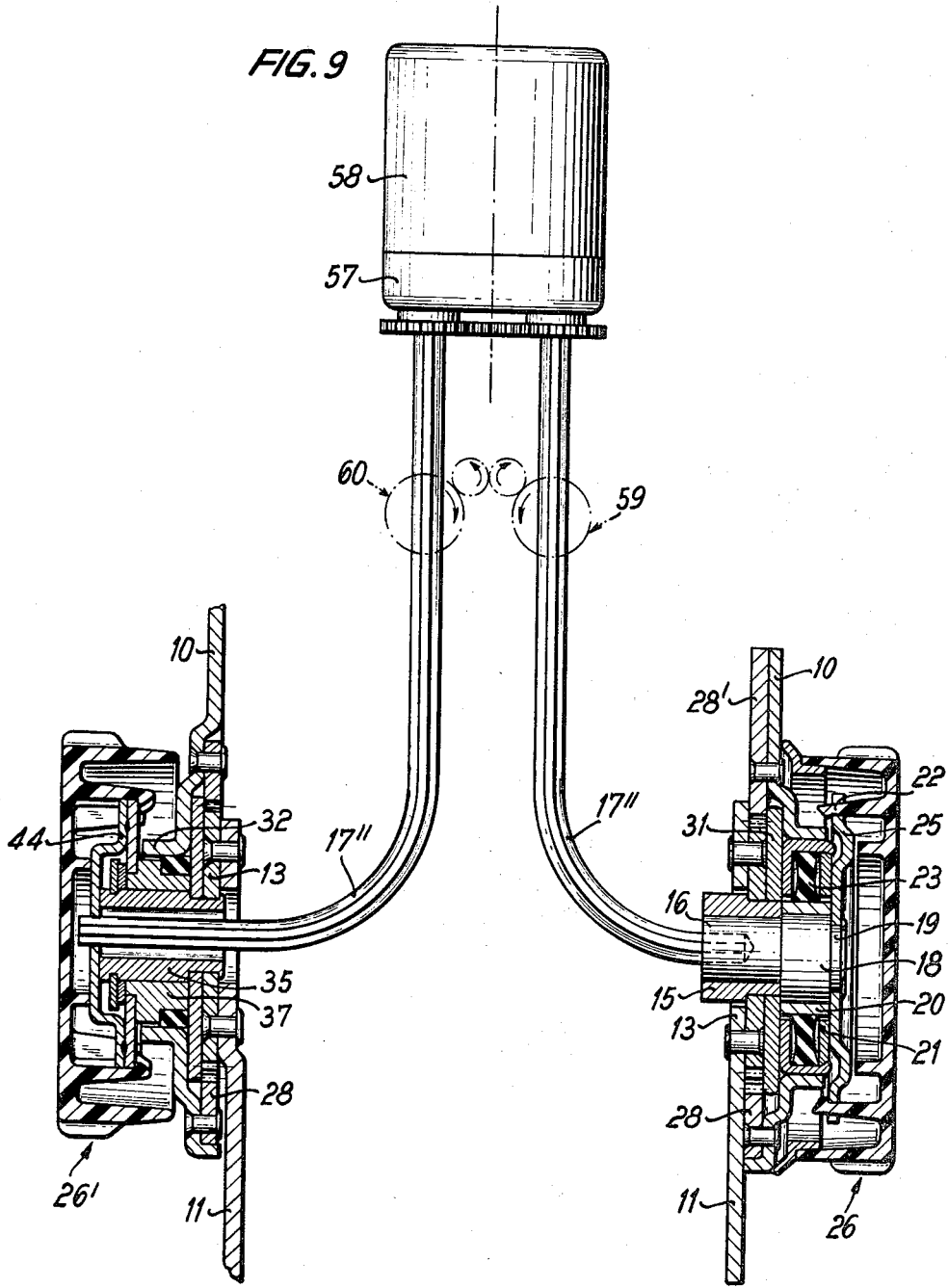

United States Patent Office 3,401,979
Patented Sept. 17, 1968

3,401,979
ARTICULATED MOUNT FOR SEATS, PARTICULARLY MOTOR VEHICLE SEATS
Peter Ulrich Putsch, Remscheid-Hasten, Germany, assignor of one-half to Friedrich W. Putsch, Remscheid-Hasten, Germany
Filed Aug. 1, 1966, Ser. No. 569,431
11 Claims. (Cl. 297—362)

ABSTRACT OF THE DISCLOSURE

A hinge unit for a seat, especially a motor vehicle seat, having a back rest pivotally adjustable with respect to the seat portion, in which self-locking adjusting means connect a first hinge member connected to the back rest to a second hinge member connected to the seat portion for pivotal movement with respect to each other and in which the self-locking adjusting means include an internally toothed ring gear connected to one of the hinge members, an externally toothed gear meshing with the ring gear and connected to the other of the hinge members and having an outer diameter smaller by at least the height of one tooth than the root diameter of the ring gear, and turnable pivot means including an eccentric portion cooperating with one of the gears for moving the latter relative to the other gear to thereby move the back rest to an adjusted position.

---

The invention relates to an articulated mount for seats, particularly motor vehicle seats, having two parts connected articulatingly with each other, one of which is associated with the seat while the other is associated with the seat back, the said parts having an adjusting and locking means. Countless embodiments of articulated mounts of this type are known. All the previous embodiments have the disadvantage that they require relatively considerable space in which to be accommodated. Furthermore, the known adjusting and locking means of such articulated mounts are complicated and consist of a plurality of individual components.

The invention is based on the problem of improving articulated mounts of the type described in greater detail above, the aforesaid disadvantages of known embodiments being eliminated thereby. According to the invention, this aim is substantially achieved in that the adjusting and locking means consists of an internally-toothed gear ring having a plurality of teeth, and an externally-toothed gear disc, the number of teeth on the gear ring differing from the number of teeth on the gear disc by at least one tooth, and in which a relative movement between the gear ring and the gear disc is achieved through an eccentric member. By the embodiment of articulated mount according to the invention, considerable advantages are offered as compared with the prior art. Above all, little space is needed for fitment of the articulated mount according to the invention, which is of decisive importance to its use in motor vehicles because the space available therein is known to be very limited. Furthermore, the design of articulated mount according to the invention offers the substantial advantage that the parts of the adjusting and locking means, namely the gear ring and gear disc can be optionally associated with the seat or the back of the seat.

As already stated, the number of teeth on the gear disc differs from the number of teeth on the gear ring by at least one tooth. This is the preferred embodiment of the invention. However, the difference between the numbers of teeth may be increased if required. Furthermore, it should be stated that, with a difference of one tooth, the minimum number of teeth is approximately 30. The absolute number of teeth available can be somewhat less if the difference between the numbers of teeth is increased.

There are two possibilities with regard to relative movement between the gear ring and gear disc. Namely, either the gear disc can be caused to roll around the internally-toothed gear ring or the gear ring is adapted to roll around the gear disc.

According to a further proposal of the invention, the adjusting and locking means has a compensating bearing to offset any tolerances which arise during manufacture of the component parts. Such a compensating bearing expediently has a resilient member accommodated in a variable-volume space and consisting for example of a rubber ring. With such a compensating bearing, the production tolerances which are inevitable in the manufacture of component parts is quite easily compensated. Furthermore, the compensating bearing eliminates clearance between the co-operating parts of the articulated mount so that undesirable rattling noises are also eliminated.

With regard to the configuration of the eccentric member, there are similarly two basic possibilities. Namely, on the one hand, the eccentric member can be a solid member; on the other, however, it can be shaped as an annular member. In both cases, it is advisable to use metals, particuarly sintered metals or a pressure casting in the production of the eccentric member.

If the eccentric member is an annular member, it is advisable to dispose it on one side on a fixed and non-rotatable bearing and, on the other, to have it act on an intermediate element which carries the gear ring. In order to dispense with a special, i.e. additional intermediate element, it is recommended to use angled parts on one part of the articulated mount, for example of the top part, as the intermediate element.

The annularly-shaped eccentric member, according to another proposal of the invention, has a concentric unilateral extension. In the region of this extension are provided teeth which co-operate with matching teeth on a drive wheel which is in turn provided with grips and is adapted to co-rotate.

With regard to the arrangement of the aforesaid compensating bearing, the following possibilities arise: according to a first proposal, the compensating bearing is disposed on the peripheral face of the in (in this case) solid eccentric member. However, according to a second proposal, the eccentric member can also have, integral with it, a concentrically-disposed bearing pin, the peripheral surface of which is then utilised to accommodate the compensating bearing.

In the hitherto known articulated mounts for motor vehicle seats, difficulties often arise in simply accommodating the drive means for the adjusting and locking arrangement. The invention also aims to demonstrate how these difficulties can be eliminated by simple measures. According to the invention, it is proposed, on the one hand to have the drive means for the adjusting and locking arrangement engage on the articulated mount from the inside thereof and, on the other, to use a flexible shaft as the drive means, the actuating point being at any freely selectable place in a motor vehicle. By this arrangement, it becomes possible to select such places in the motor vehicle, for accommodating the driving means controls, as are easily accessible to the driver or passenger. Furthermore, the flexible shaft or the control thereof can be accommodated in places in the motor vehicle which are normally regarded as dead space.

Actuation of the drive means, in other words the flexible shaft, can be achieved in various ways. For example, the actuating means may be a motor, for example an electric motor, which acts on the flexible shaft through a reduction gear. In addition, it is also possible to actuate the shaft through a hand-wheel, such as a rotary handle. In the former case, the force of a motor is used in order to adjust the seat back to the desired position whereas, in the second case, a more inexpensive construction is offered because the seat back is adjusted by hand.

In those embodiments of an articulated mount in which a motor with reduction gear is used as the means of actuating the flexible shaft, it is advisable to associate with the adjusting and locking arrangement a further actuating means, preferably a rotary handle, which may be used optionally and which is fitted on the outside of the articulated mount. This second actuating means would merely have the purpose of allowing the seat back to be adjusted even if the motor or the like should fail. In this respect, it is advisable, before using the manual control, to disengage the motor from the gear. This can easily be done, for example by disengaging a pinion of the motor from the motor.

A plurality of embodiments of the invention are illustrated in the attached drawings, in which:

FIG. 1 is a longitudinal cross-section through a first embodiment of an articulated mount constructed according to the invention, with a part thereof broken away and the section being taken along the line I—I of FIG. 2;

FIG. 2 is a plan view of an articulated mount according to FIG. 1 but on a reduced scale;

FIG. 7 shows partly in cross-section and partly in elevation a fourth embodiment of an articulated mount according to the invention;

FIG. 8 is a cross-section through an articulated mount as shown in FIG. 7, swivelled through 90° in respect of FIG. 7 and shown on a somewhat enlarged scale, and FIG. 9 shows a fifth embodiment of an articulated mount according to the invention, partly in cross-section, partly in elevation.

Figure 3:
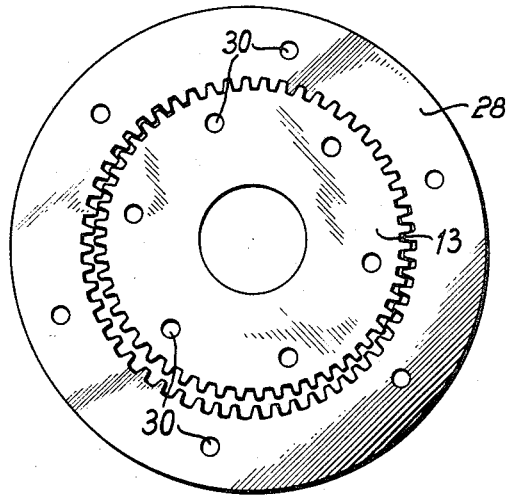
FIG. 3 is an elevation of a locking and adjusting means for the articulated mount shown in FIGS. 1 and 2.

The articulated mount for a seat, particularly for a motor vehicle seat, on which FIGS. 1 to 3a are based, consists of the top part 10 and the bottom part 11 which are connected articulatingly together. The top part 10 is associated with the seat back while the bottom part 11 is associated with the actual seat. Fitment thereto is by per se known means. Apertures, which it is not intended to designate in greater detail, are associated with both parts for penetration of the fixing means.

A gear disc 13 is attached to the bottom part 11 by means of rivets 14. Also associated with the bottom part 11 is a bearing bush 15 which accommodates a pivot pin 16 having a blind-end bore, not described in greater detail, into which projects one end of a shaft 17 which is a flexible shaft leading to the other, opposite side of the seat, where an articulated mount of the same construction as that shown in FIG. 1 is similarly disposed. For the sake of simplicity, only one of the two articulated mounts is illustrated and described.

Integral with the pivot pin 16 is an eccentric member 18 and a pivot 19. On the eccentric member 18 is a bush 20 which forms one part of a compensating bearing. The compensating bearing also includes a counter-ring 21 and a bearing shell 20 which enclose a space between them in wich is fitted a rubber-resilient annular member 23. Between the outer peripheral surface of the bush 20 and the end faces of the counter-ring 21 and the bearing shell 20 is a gap 24. The compensating bearing comprising parts 20, 21, 22 and 23 serves to compensate for any manufacturing tolerances in the parts which are to be assembled. When the component parts of the articulated mount are assembled, the resilient annular member 23 may be compressed to a greater or lesser degree. This is possible having regard to the aforesaid gap 24, the width of which simultaneously restricts the amount of compression of the annular member 23.

The pivot 19 carries a drive plate 25 which is secured in its position by a rivet-head-shapted form of the front, free end of the pivot 19. Connected to the drive plate 25 is a grip which, in the embodiment shown, takes the form of a rotary handle 26. The rotary handle 26 has a plurality of retaining hooks 27, portions of which engage through recesses (not described in greater detail) in the drive plate 25 so that their hook-like front ends are applied arrestingly behind parts of the drive plate 25. Provided on the inside of the rotary handle 26 is an encircling bracing web 48 which can enter into active connection with the outer face of the drive plate and which is intended to prevent parts of the rotary handle 26 being pushed through during use.

Figure 3A:
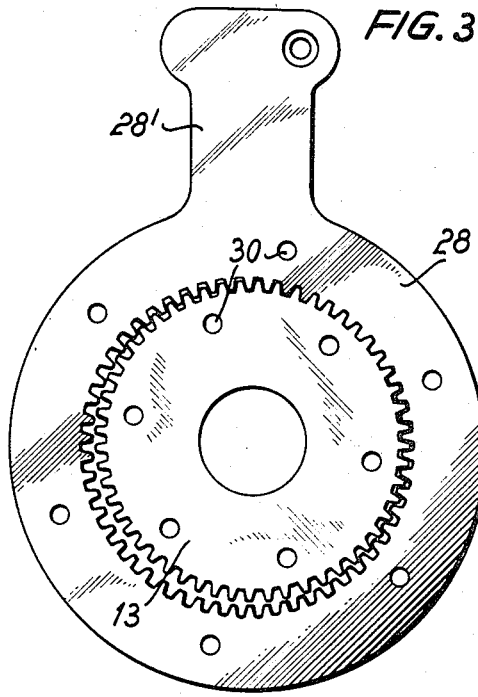
FIG. 3a is similarly an elevation of a second embodiment of the adjusting and locking means.

Co-operating with the aforesaid gear disc 13 is a gear ring 28 secured by rivets 29 to the top part 10. The configuration of the gear disc and gear ring is best seen in FIGS. 3 and 3a. These show that the gear disc 13 is a flat member having a plurality of teeth around its periphery. The bearing bush 15 (see FIG. 1) engages into the bore (not to be described in greater detail) in the gear disc 13. In contrast to the gear disc 13, the gear ring 28 is internally-toothed. The number of teeth on the gear disc 13 differs from the number of teeth on the gear ring 28 by at least one tooth. FIGS. 3 and 3a furthermore show that, of the many teeth, only a relatively small proportion are in engagement with one another. In the embodiment illustrated, these are the teeth located in the upper portion. It should however be mentioned that the point of engagement of the teeth changes as a function of the position of the seat back. The part of the teeth in engagement is in every case adequate for the desired positional retention of the articulated mount and therefore of the seat back. Additional arresting means are not required. The apertures 30 which are provided both in the gear disc 13 and in the gear ring 28 serve for penetration of the rivets 14, 29.

As FIG. 2 shows, the articulated mount illustrated incorporates that embodiment of adjusting and locking arrangement which is reproduced in FIG. 3a. This differs from that shown in FIG. 3 essentially in that the gear ring 28 has an extension 28'. This extension serves solely to improve the strength properties of the top part 10. Limiting walls of the extension 28' bear on a raised edge (not described in greater detail) of the top part 10 so relieving the fixing rivets. Furthermore, the extension 28' has an aperture passing through it so that, in this case, too, securing by two fixing means is possible.

It must be added that, between the gear disc 13 and the adjacent compensating bearing, there is a bracing ring 31. The compensating bearing is braced on its peripheral surface by an angled encircling portion 32 of the top part 10. This bracing zone is created in that parts of the top part 10 are angled outwardly. It must also be mentioned that the bearing bush 15 is secured in place by a retaining ring 33. The retaining ring 33 is located at that part of the pivot pin 16 at which the diameter of this latter is reduced. As FIG. 1 shows, the rotary handle 26 has inset in it a masking ring 34 which masks parts of the articulated mount, in other words makes them invisible to the onlooker.

Figure 4:
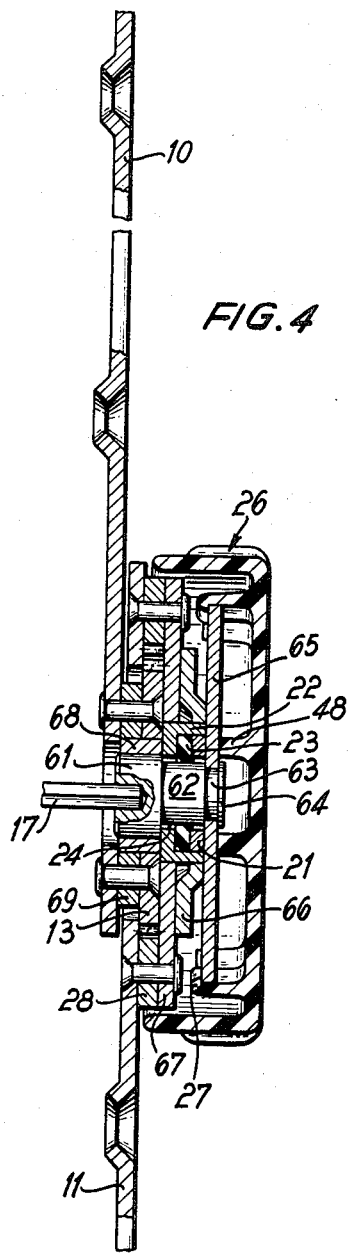
FIG. 4 is longitudinal cross-section through a second embodiment of the articulated mount according to the invention with part thereof broken away.

The embodiment of an articulated mount according to FIG. 4 differs from that previously described mainly in that the gear disc 13 is disposed to roll within the gear ring 28. Accordingly, the gear disc 13 is now associated with the top part while the gear ring 28 is associated with the fixed bottom part 11.

In the embodiment shown in FIG. 4 of the drawings, the eccentric member is designated by the reference numeral 61. It has a blind-end bore in it, into which engages the free end of the flexible shaft 17. On the peripheral surface of the eccentric member 61 is a sleeve 68. On the outside of this sleeve 68 is, on the one hand, the gear disc 13 and a spacer 69 which is situated laterally of the gear disc 13.

The eccentric member 61 has on one side a pivot pin 62 which co-operates with the compensating bearing. Stepped in diameter and adjacent the pivot pin 62 is a pivot 63, the free end 64 of which is shaped as a rivet head. By means of this, a drive plate 65 which makes the connection with the rotary handle 26 is secured in position.

The compensating bearing has substantially the same form as the one previously described; only the sleeve 20 is eliminated. Thus, the inner wall of the bore of the resilient annular member 23 bears directly on the outer face of the pivot pin 62. As previously, however, a gap 24 is provided, i.e. the walls of the counter-ring 21 and the bearing shell 22 do not under normal circumstances come directly in contact with the outer face of the pivot pin 62.

For the rest, the compensating bearing is impressed into two discs 66 and 67, as shown in FIG. 4, the said discs having different diameters, the disc 67 being the larger in diameter so that it is gripped by the fixing rivets which pass through the gear ring 28. For the rest, the two discs 66 and 67 are connected rigidly to each other, for example by welding.

As the rotary handle is moved, the gear disc 13 rolls around in the gear ring 28 to bring about the desired adjustment of the top part 10 and thus of the seat back.

Figure 5:
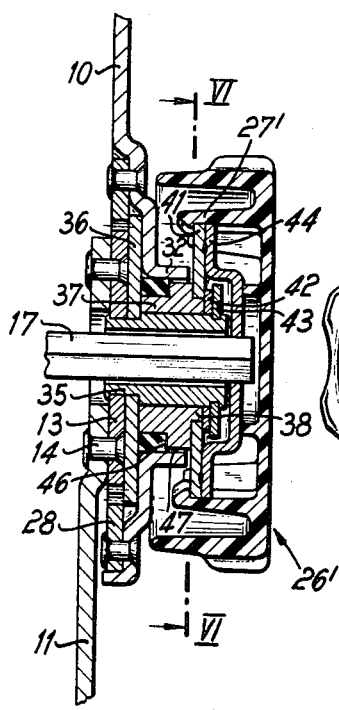
FIG. 5 is a longitudinal cross-section through a third embodiment of the articulated mount according to the invention, with part thereof broken away.
Figure 6:
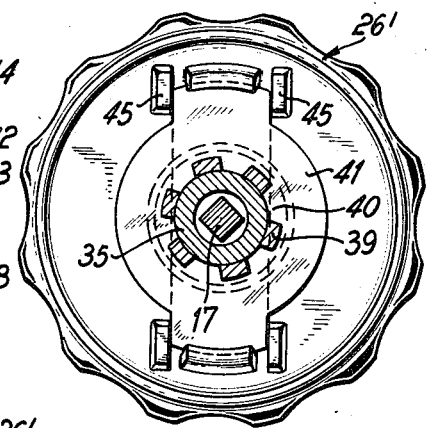
FIG. 6 is a cross-section taken along the line VI—VI of FIG. 5.

In the embodiment of the invention shown in FIGS. 5 and 6, the solid eccentric member is replaced by an angularly-formed eccentric member. In detail, the following will then apply:

A gear disc 13 is again secured to the bottom part 11 of the articulated mount by means of rivets 14. Associated with the gear disc 13 is a bearing bush 35, one end of which is shaped as a rivet head, the said rivet head bearing on the outer face of the gear disc 13. Laterally alongside the gear disc 13 is a bracing ring 36 and, laterally thereof, the eccentric member shaped as an annular member and now designated by the reference numeral 37. The eccentric member 37 has a concentrically-formed unilateral extension 38. In the region of this extension 38, toothlike projections 39 are formed by the removal of material and the projections 39 co-operate with counter-teeth 40 on a drive plate 41. On the concentric extension 38 is an intermediate ring 42 and, laterally thereof, a retaining ring 43 which engages in a groove in the bearing bush 35 so that the latter is secured against displacement in the axial direction. Rigidly connected, for example by welding, to the drive plate 41 is an approximately U-shaped member 44 having a centrally-disposed aperture into which engages the free end of the flexible shaft 17 which is of non-circular cross-section. As FIG. 6 shows, there are on the inside of the rotary handle 26' projections 45 which are mutually spaced from one another such that they correspond exactly to the width of the U-shaped member 44. By reason of this and by means of retaining hooks 27', the rotary handle 26' is coupled to the other parts of the articulated mount. The drive plate 41 is in this case the connecting link between the eccentric member 37 and the rotary handle 26'.

The annularly-shaped eccentric member 37 is made from metal and can for example be made from sintered metal or a pressure casting. In an annular recess (not to be described in greater detail) in the eccentric member 37 is a resilient annular member 46. Again, a gap 47 is left free between the outer peripheral face of the eccentric member 37 so that the desired compensation of tolerances can take place when the component parts are assembled. In this case, too, the top part 10 is provided with an angled portion 32, the inner wall of which serves to brace the compensating bearing. The gear ring 28 co-operates with the gear disc 13 and is in this case shaped as shown in FIG. 3.

The embodiment of an articulated mount as shown in FIGS. 7 and 8 of the drawings differs from the afore-described embodiments basically in that the adjusting and locking means is remotely operated. The articulated mount is of the same construction as that shown in FIG. 1 of the drawings, except that the rotary handle 26 is removed and replaced by a cover 49 which serves only to conceal parts of the articulated mount, and is not used to transmit forces. Therefore, there is no need to discuss again individual parts of the articulated mount.

Once again, into a blind-end bore in the pivot pin 16 engages the end of a flexible shaft which is now designated by the reference numeral 17'. It is approximately L-shaped in form. The other, opposite end of the flexible shaft engages in the blind-end bore of a rotary member 50 which is mounted in a friction bearing 51 provided in the body part 52 of a motor vehicle. 53 are per se known elements for position-retention of the rotary member 50. The rotary member 50 merges into a cross-sectionally polygonal part 54 which is coupled to a rotary handle 26'', for co-rotation. Removal of the rotary handle 26'' from the extension 54 is prevented by a retaining ring 56. The rotary handle 26'' has a cover 55. Rotation of the rotary handle 26'' drives the eccentric member 18 through the flexible shaft 17', so adjusting the seat back through the adjusting arrangement.

In the embodiment of an articulated mount as shown in FIG. 9 of the drawings, adjustment of the articulated mount is achieved by a motorised drive. It must first be stated that the right-hand articulated mount shown in FIG. 9 corresponds exactly to the embodiment shown in FIG. 1 of the drawings and that the left-hand articulated mount corresponds exactly to the embodiment shown in FIG. 5 of the drawings so that reference can to this extent be made to the earlier embodiments. It must further be mentioned that the two rotary handles 26, 26' are intended only for emergency conditions, i.e. they are used only if the electro-motorised drive, which is still to be described, should fail for any reason.

Associated with each articulated mount according to FIG. 9 of the drawings is a flexible shaft, now designated by the reference numeral 17'', which again has the form of an L. The end of the right-hand flexible shaft 17'' engages in the blind-end bore of the pivot pin 16 while the end of the left-hand flexible shaft 17'' engages on the other hand in the aperture in the U-shaped member 44.

Both ends of the flexible shafts 17'' co-operate with a reduction gear 57 of per se known type. The reduction gear 57 is driven by a motor 58, for example an electric motor. The construction of the reduction gear 57 is shown diagrammatically in FIG. 9 and, in fact, 59 designates a first reduction gear stage and 60 a second such stage. Of the two pinions of the reduction stages, only one is driven by the motor 58. The other gear-wheels of the reduction gear then move in the direction of the arrows shown in the drawing. If, upon failure of the motor 58, manual operation is desired, then the motor 58 and reduction gear 57 must first be disengaged. For example, the motor pinion can be disengaged from the motor, in order to achieve this. This is a simple operation because spur-gear couplings are used.

As already stated, the embodiments shown are only exemplary forms of the invention and this latter is not confined to them. It is rather more the case that any other embodiments and applications are possible. For example, particularly, the articulated mounts shown can be interchanged, i.e. in the embodiment according to FIG. 9, identically-shaped articulated mounts may be provided on both sides of the seat. For the rest, the flexible shaft 17, 17' and 17'' may have any desired form. This offers the possibility of placing the driving means for the adjusting and locking arrangement at any desired location within a motor vehicle. In particular, spaces can be utilized which previously were regarded as dead space in motor vehicles.

I claim:

1. A hinge unit for a seat having a seat portion and a back rest pivotally adjustable about a pivot axis and lockable in any adjusted position with respect to said seat portion, said hinge unit comprising a first member associated with said seat portion; a second member associated with said back rest; and self-locking adjusting means extending along said pivot axis and including an internally toothed ring gear fixed to one of said members, an externally toothed gear fixed to the other of said members and having teeth in engagement with teeth of said ring gear, the outer diameter of said externally toothed gear being smaller by at least the height of one tooth than the root diameter of said ring gear, pivot means extending along said pivot axis and including an eccentric portion cooperating with one of said gears for moving the latter during turning of said pivot means relative to the other of said gears to thereby move said back rest to and lock said back rest in an adjusted position, and turning means connected to said pivot means for turning the same about said pivot axis.

2. A hinge unit as defined in claim 1, wherein said ring gear is fixed to said second member associated with said back rest and said eccentric portion cooperates with said ring gear to move the latter relative to said externally toothed gear.

3. A hinge unit as defined in claim 1, wherein said externally toothed gear is fixed to said second member associated with said back rest and said eccentric portion cooperates with said externally toothed gear to move the latter relative to said ring gear.

4. A hinge unit as defined in claim 1, wherein said self-locking adjusting means further comprises a compensating bearing between said pivot means and said ring gear for compensating for any inaccuracies in the dimensions of the components of said self-locking adjusting means.

5. A hinge unit as defined in claim 4, wherein said compensating bearing includes a resilient annular member extending about said pivot axis.

6. A hinge unit as defined in claim 1, wherein said eccentric portion of said pivot means is of annular form and mounted on a fixed, non-rotatable member coaxial with said pivot axis.

7. A hinge unit as defined in claim 6 and including an intermediate element between said ring gear and said eccentric portion, said intermediate element being formed by an angled portion of said second member.

8. A hinge unit as defined in claim 6, wherein said turning means comprise a drive plate and a handle connected to said drive plate, and wherein said eccentric portion has a toothed extension in mesh with corresponding teeth on said drive plate.

9. A hinge unit as defined in claim 1, wherein said self-locking adjusting means comprises a compensating bearing surrounding said eccentric portion.

10. A hinge unit as defined in claim 1, wherein said turning means comprise a drive member connected to the inner end of said pivot means.

11. A hinged unit as defined in claim 10, wherein said turning means include manually operable means connected to the outer end of said pivot means.

References Cited

UNITED STATES PATENTS

| | | | |
|---|---|---|---|
| 2,784,770 | 3/1957 | Herr | 297—367 |
| 3,044,830 | 7/1962 | Kolle | 297—361 |
| 3,051,526 | 8/1962 | Werner et al. | 297—367 |
| 3,058,148 | 10/1962 | Beierbach et al. | 297—369 |
| 3,099,485 | 7/1963 | Beierbach et al. | 297—373 |
| 3,156,004 | 11/1964 | Strien et al. | 297—367 |
| 3,259,433 | 7/1966 | Werner | 297—367 |
| 3,299,466 | 1/1967 | Werner | 297—366 XR |
| 3,315,298 | 4/1967 | Strien et al. | 297—374 XR |
| 3,333,891 | 8/1967 | Werner et al. | 297—362 |
| 3,333,892 | 8/1967 | Werner et al. | 297—362 |

FOREIGN PATENTS

| | | |
|---|---|---|
| 1,259,594 | 3/1960 | France. |
| 1,042,181 | 9/1966 | Great Britain. |

BOBBY R. GAY, *Primary Examiner.*

G. O. FINCH, *Assistant Examiner.*